United States Patent
Kozakaya

(10) Patent No.: US 10,402,634 B2
(45) Date of Patent: Sep. 3, 2019

(54) INFORMATION PROCESSING DEVICE, INFORMATION PROCESSING METHOD, AND COMPUTER PROGRAM PRODUCT

(71) Applicant: Kabushiki Kaisha Toshiba, Minato-ku (JP)

(72) Inventor: Tatsuo Kozakaya, Kawasaki (JP)

(73) Assignee: Kabushiki Kaisha Toshiba, Minato-ku (JP)

(\*) Notice: Subject to any disclaimer, the term of this patent is extended or adjusted under 35 U.S.C. 154(b) by 0 days.

(21) Appl. No.: 15/690,700

(22) Filed: Aug. 30, 2017

(65) Prior Publication Data

US 2018/0253597 A1 Sep. 6, 2018

(30) Foreign Application Priority Data

Mar. 3, 2017 (JP) ................. 2017-040411

(51) Int. Cl.
*G06K 9/00* (2006.01)
*G06K 9/62* (2006.01)
(Continued)

(52) U.S. Cl.
CPC ..... *G06K 9/00362* (2013.01); *G06K 9/00335* (2013.01); *G06K 9/00369* (2013.01);
(Continued)

(58) Field of Classification Search
CPC ........ H04N 7/181; H04N 7/18; H04N 19/537; H04N 5/2256; H04N 5/23212; H04N 5/23219; H04N 5/23296; H04N 7/183; H04N 13/218; H04N 1/00127; H04N 1/00278; H04N 1/00326; H04N 1/0044; H04N 1/00965; H04N 1/00968; H04N 1/2112; H04N 1/2154; H04N 1/32101;
(Continued)

(56) References Cited

U.S. PATENT DOCUMENTS 5,959,672 A \* 9/1999 Sasaki ................. H04N 19/503
375/240.14
5,961,571 A \* 10/1999 Gorr ....................... G01S 3/783
340/988
(Continued)

FOREIGN PATENT DOCUMENTS

JP 2015-139007 7/2015

OTHER PUBLICATIONS

Tomoki Watanabe "High-precision person detection technology using the quantity of new feature", TOSHIBA review, vol. 65, No. 4, 2010, 4 pages ( with English Translation).
(Continued)

*Primary Examiner* — Aklilu K Woldemariam
(74) *Attorney, Agent, or Firm* — Oblon, McClelland, Maier & Neustadt, L.L.P.

(57) ABSTRACT

According to an embodiment, an information processing device includes a memory and processing circuitry. The processing circuitry is configured to receive an image and area information indicating a first area. The processing circuitry is configured to detect an object from the image. The processing circuitry is configured to, based on positional relationship between the first area and the object, estimate probability of occurrence of an event in the first area.

16 Claims, 5 Drawing Sheets

(51) Int. Cl.
*G06T 7/70* (2017.01)
*G08B 13/196* (2006.01)

(52) U.S. Cl.
CPC ....... *G06K 9/00771* (2013.01); *G06K 9/6271* (2013.01); *G06K 9/6277* (2013.01); *G06T 7/70* (2017.01); *G08B 13/196* (2013.01); *G06K 2009/00738* (2013.01); *G06T 2207/30196* (2013.01)

(58) Field of Classification Search
CPC .......... H04N 1/32133; H04N 1/32561; H04N 1/32587; H04N 1/32593; H04N 1/32603; H04N 1/46; H04N 2101/00; H04N 2201/0008; H04N 2201/0084; H04N 2201/3222; H04N 2201/3261; H04N 2201/3264; H04N 2201/3269; H04N 2201/3276; H04N 2201/328; H04N 5/225; H04N 5/228; H04N 5/232; H04N 5/23229; H04N 5/235; H04N 5/2628; H04N 5/3696; H04N 5/378; H04N 5/76; H04N 21/23418; H04N 21/854; G06K 9/00771; G06K 9/6253; G06K 9/00228; G06K 9/00335; G06K 9/6277; G06K 9/00362; G06K 9/00302; G06K 9/00805; G06K 15/00; G06K 19/06037; G06K 19/073; G06K 1/121; G06K 7/10762; G06K 7/14; G06K 7/1417; G06K 9/00288; G06K 9/2063; G06K 9/32; G06K 9/62; G06K 9/00; G06K 9/00248; G06K 9/00295; G06K 2009/00322; G06K 2009/00328; G06K 9/00221; G06K 9/00261; G06K 9/00342; G06K 9/00369; G06K 9/00677; G06K 9/3241; G06K 9/6255; G06K 9/6857; G06K 9/72; G06Q 30/02; G06Q 10/0635; G06Q 10/06; G06Q 10/06311; G06Q 30/0251; G08G 1/166; G06N 5/02; G06T 7/004; G06T 7/70; G06T 2207/30196; G06T 7/00; G06T 2207/10016; G06T 2207/30201; G06T 7/248; G06T 2207/20092; G06T 2207/30241; G06T 7/215; G06T 1/0007; G06T 2207/10021; G06T 2207/10024; G06T 2207/20076; G06T 2207/30204; G06T 2207/30232; G06T 7/20; G06T 7/246; G06T 7/593; G06T 7/73; G06T 2207/20016; G06T 2207/20064; G06T 5/003; G06T 5/005; G06T 7/75; G08B 13/19608; G08B 13/19615; G08B 13/19645; G08B 13/1968; G08B 13/19682; G08B 13/196; G05B 19/414; G06F 2200/1637; G06F 19/00; G16H 40/20; G16H 50/20; H01L 2924/0002; H01L 2924/00; H01L 23/576; H01L 27/14605; A61B 5/1113; A61B 5/1117; A61B 5/1128; A63F 13/06; A63F 13/213; A63F 13/422; A63F 13/428; A63F 13/655; B41J 11/0005; B41J 11/70; B41J 15/04; B41J 2002/041; B41J 2202/21; B41J 2/14314; B41J 2/14427; B41J 2/16585; B41J 2/17513; B41J 2/17596; B41J 3/445; B82Y 30/00; G01B 11/14; G03B 13/36; G09G 5/00; G10L 17/00; G10L 17/005; G11B 27/034; G11B 27/28; G11B 27/34
USPC ......... 382/103, 110, 115, 118; 348/135, 150, 348/222, 345
See application file for complete search history.

(56) References Cited

U.S. PATENT DOCUMENTS

| | | | | |
|---|---|---|---|---|
| 7,899,208 B2* | 3/2011 | Kondo | ................ | G06K 9/32 348/135 |
| 8,660,699 B2* | 2/2014 | Iba | ............ | B25J 9/1679 700/260 |
| 8,949,164 B1 | 2/2015 | Mohler | | |
| 2003/0043290 A1* | 3/2003 | Sasaki | ............... | H04N 5/2256 348/345 |
| 2004/0013295 A1* | 1/2004 | Sabe | ............... | G06K 9/00664 382/153 |
| 2004/0161134 A1* | 8/2004 | Kawato | ............. | G06K 9/00228 382/118 |
| 2005/0129276 A1* | 6/2005 | Haynes | ............. | G06K 9/00228 382/103 |
| 2006/0104487 A1* | 5/2006 | Porter | ............... | G06K 9/00228 382/118 |
| 2006/0198554 A1* | 9/2006 | Porter | ............... | G06K 9/00228 382/159 |
| 2008/0037837 A1* | 2/2008 | Noguchi | ........... | G06K 9/00335 382/118 |
| 2009/0049001 A1 | 2/2009 | Nickerson | | |
| 2010/0013931 A1 | 1/2010 | Golan et al. | | |
| 2010/0201509 A1 | 8/2010 | Hara et al. | | |
| 2011/0058028 A1* | 3/2011 | Sakai | ............... | G06K 9/00288 348/77 |
| 2011/0221890 A1* | 9/2011 | Yamashita | ............. | G06T 7/248 348/135 |
| 2011/0316697 A1 | 12/2011 | Krahnstoever et al. | | |
| 2012/0045095 A1* | 2/2012 | Tate | ............... | G06T 5/003 382/103 |
| 2012/0114226 A1* | 5/2012 | Kameyama | ........ | G06K 9/00221 382/155 |
| 2013/0069978 A1* | 3/2013 | Tanaka | ............... | G06K 9/62 345/619 |
| 2013/0329068 A1* | 12/2013 | Hannanaka | ........ | H04N 5/23293 348/218.1 |
| 2014/0195138 A1* | 7/2014 | Stelzig | ............... | G08G 1/0116 701/119 |
| 2015/0124084 A1* | 5/2015 | Ikenoue | ............... | A63F 13/06 348/135 |
| 2016/0286244 A1* | 9/2016 | Chang | ............. | H04N 21/21805 |
| 2017/0095201 A1* | 4/2017 | Otto | ............... | A61N 5/103 |

OTHER PUBLICATIONS

Viet-Quoc Pham "The person track technology that can be chased even if it hides temporarily from the view of the camera", TOSHIBA review, vol. 70, No. 6, 2015, 4 pages ( with English Translation).

\* cited by examiner

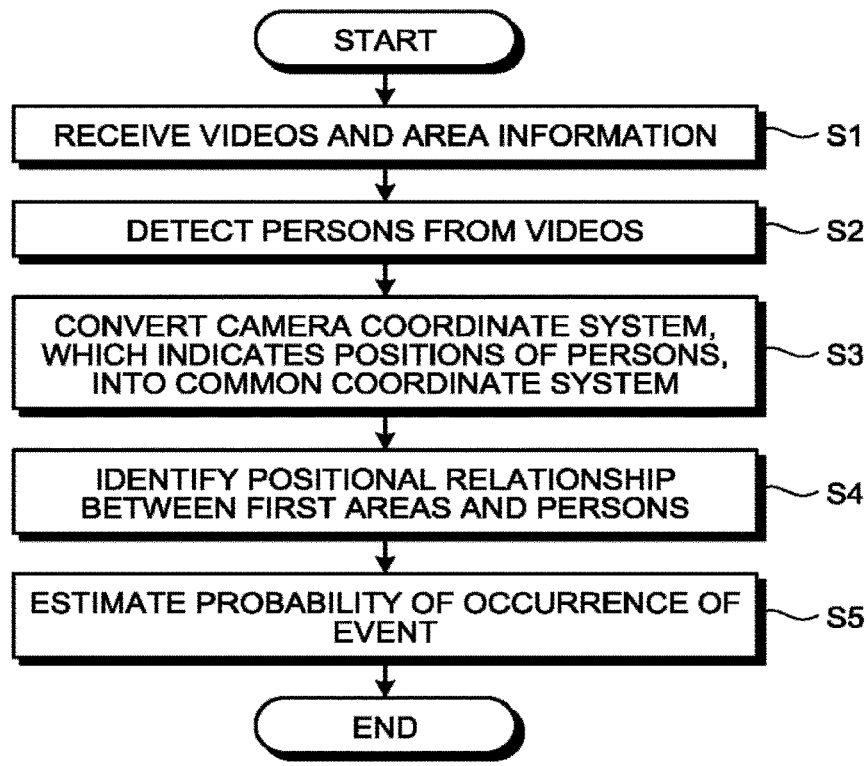
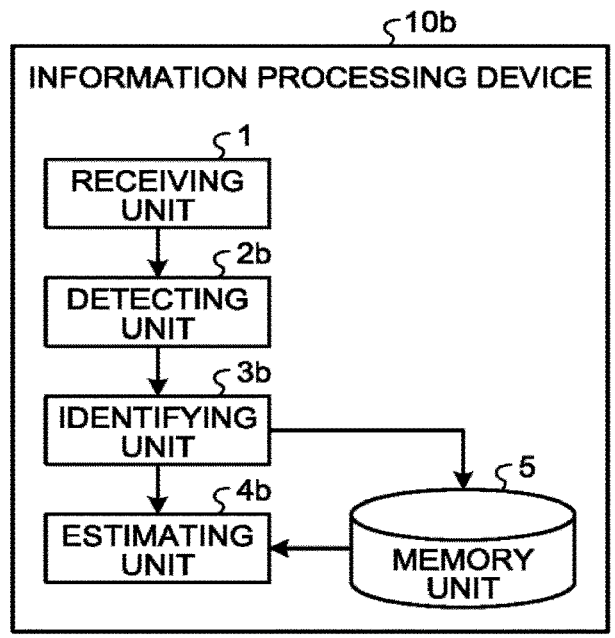

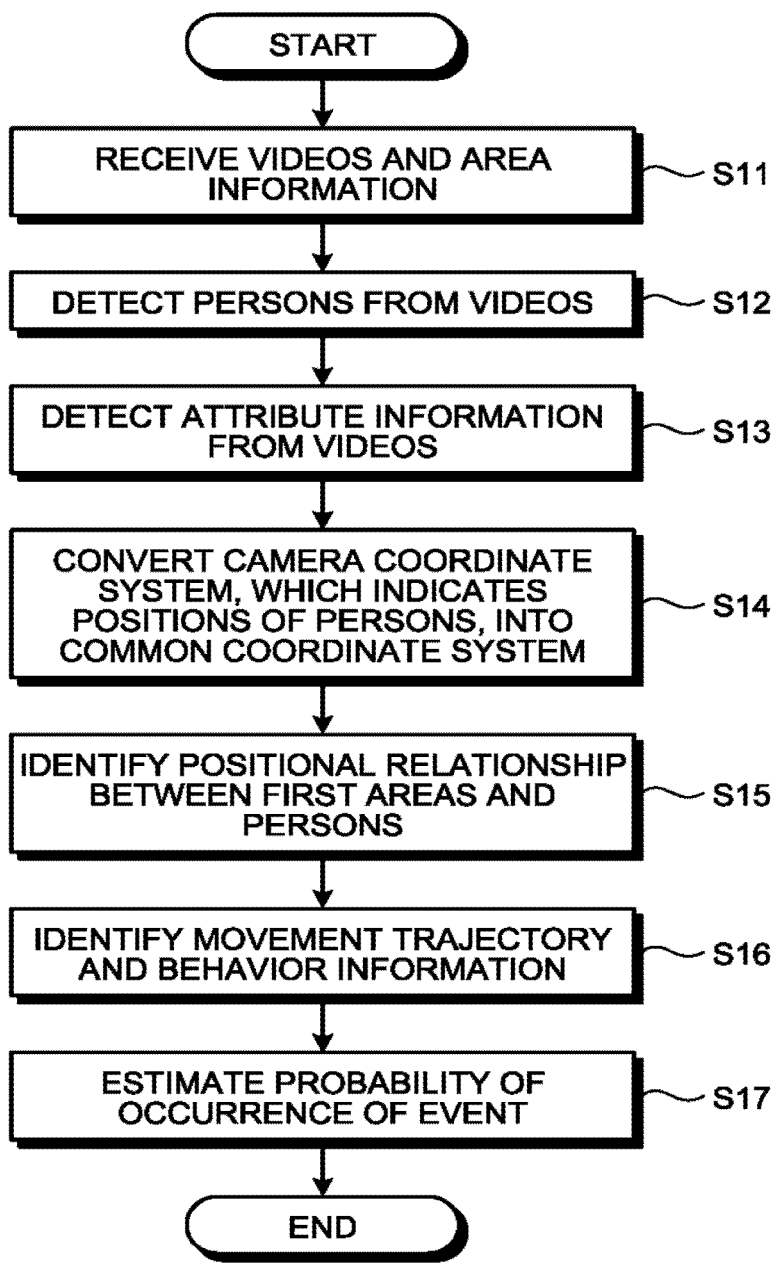

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-040411, filed on Mar. 3, 2017; the entire contents of which are incorporated herein by reference.

FIELD

Embodiments described herein relate generally to an information processing device, an information processing method, and a computer program product.

BACKGROUND

Conventionally, technologies are known for estimating the probability of occurrence or the risk of occurrence of an event. For example, a conventional technology is known for estimating the probability of occurrence of a crime according to the past criminal history at a particular location and according to information of the nearby stores. Moreover, for example, a conventional technology is known for estimating the risk of occurrence of a crime by each person who is present around a suspicious individual.

BRIEF DESCRIPTION OF THE DRAWINGS

FIG. 3 is a flowchart for explaining an exemplary information processing method according to the first embodiment;

FIG. 4 is a diagram illustrating an exemplary functional configuration of an information processing device according to a second embodiment;

FIG. 5 is a flowchart for explaining an exemplary information processing method according to the second embodiment;

DETAILED DESCRIPTION

According to an embodiment, an information processing device includes a memory and processing circuitry. The processing circuitry is configured to receive an image and area information indicating a first area. The processing circuitry is configured to detect an object from the image. The processing circuitry is configured to, based on positional relationship between the first area and the object, estimate probability of occurrence of an event in the first area.

Embodiments of an information processing device, an information processing method, and a computer program product are described below in detail with reference to the accompanying drawing.

First Embodiment

Firstly, the explanation is given about an exemplary functional confirmation of an information processing device according to a first embodiment.

Example of Functional Configuration

Figure 1:
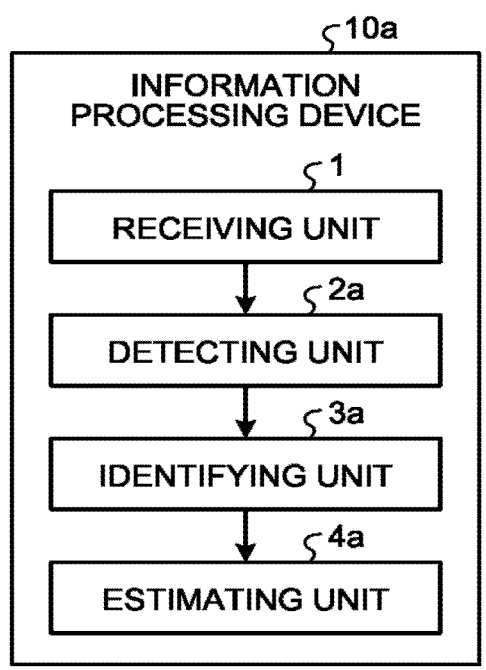
FIG. 1 is a diagram illustrating an exemplary functional configuration of an information processing device according to a first embodiment.

FIG. 1 is a diagram illustrating an exemplary functional configuration of an information processing device $10a$ according to the first embodiment. The information processing device $10a$ according to the first embodiment includes a receiving unit 1, a detecting unit $2a$, an identifying unit $3a$, and an estimating unit $4a$.

In the information processing device $10a$ according to the first embodiment, the probability of occurrence of an event is estimated as a result of the operations performed by the receiving unit 1, the detecting unit $2a$, the identifying unit $3a$, and the estimating unit $4a$. In the first embodiment, in order to promote better understanding, the explanation is given for a case in which an event implies shoplifting occurring in a retail store.

The receiving unit 1 receives one or more images and receives one or more pieces of area information indicating first areas. Herein, the images either can be videos (moving images) or can be still images. In the first embodiment, the explanation is given for a case in which the images are in the form of videos.

Herein, it is possible to use an arbitrary type of cameras for taking videos. For example, videos are taken by general-purpose security cameras using visible light. Alternatively, for example, videos are taken by cameras using near-infrared light or far-infrared light. Still alternatively, for example, videos are taken by special three-dimensional cameras or special three-dimensional sensors including depth information. Meanwhile, the viewing area of a camera may or may not overlap with a first area.

A first area is an area in which the probability of occurrence of an event is estimated. The information processing device $10a$ according to the first embodiment estimates the probability of event occurrence in each first area.

A first area can have any shape and any dimensions. For example, a first area is decided according to geographical attributes such as the front side of a shelf in a store. Moreover, for example, a first area need not be a two-dimensional plane but can be a three-dimensional stereoscopic area. Furthermore, the area settings such as the presence or absence of an area or the shape of an area can vary according to the time.

The detecting unit $2a$ detects an object from a video received by the receiving unit 1. Herein, the object can be a person or can be a physical thing other than a person. Examples of a physical thing other than a person include a robot. In the first embodiment, the explanation is given for an example in which the object is a person. The method for detecting a person from a video can be an arbitrary method. For example, the detecting unit $2a$ implements the person detection technology disclosed in Human detection technology using new type of feature quantity, Toshiba review, Vol. 65, No. 4, 2010, and detects a person from a video.

The position of a person who is detected from a video is expressed using the coordinates in the coordinate system of that video (hereinafter, called "camera coordinate system").

The identifying unit 3a identifies the positional relationship between a first area and a person. More particularly, firstly, the identifying unit 3a converts the coordinate information of the camera coordinate system into the coordinate information of a common coordinate system, which represents the coordinate system enabling calculation of the positional relationship between the first area and the person.

The common coordinate system is, for example, the coordinate system of the floor plan of a store. The identifying unit 3a represents the first area and the person in the coordinate system of the floor plan of the store, and identifies the positional relationship between the first area and the person.

If the position of the camera in the common coordinate system, the orientation of the camera, and the field of view of the camera are known; then the coordinate conversion from the camera coordinate system into the common coordinate system can be geometrically calculated.

Meanwhile, if some persons are separately detected from videos taken by a plurality of cameras, the coordinate information of the persons in the camera coordinate system of the cameras can be converted into the coordinate information of the common coordinate system so that the positional relationship between the first areas and the persons can be identified in an integrated fashion.

The estimating unit 4a estimates, from the positional relationship of a first area and a person, and the probability of occurrence of an event in the first area.

In the first embodiment, the probability of occurrence of an event implies the probability of occurrence of shoplifting. Regarding shoplifting, even if there is a person intending to do shoplifting (for convenience sake, called a potential shoplifter), it is not always necessary that shoplifting occurs. In order to avoid getting exposed for shoplifting, a potential shoplifter examines the surrounding situation by necessity and determines whether or not to do shoplifting. Thus, in a first area, it is necessary to take into account not only a potential shoplifter but also the surrounding situation in order to predict shoplifting.

Moreover, from a video, it is not easy from outside to determinably observe whether or not a particular person is a potential shoplifter. Hence, it is difficult to intensively analyze a particular person as a potential shoplifter (as a suspicious individual).

In that regard, the estimating unit 4a determines, from the positional relationship of a first area and the persons present around the first area, whether or not the situation is prone to shoplifting; and infers the probability of occurrence of shoplifting in the first area. For example, the estimating unit 4a uses definition information of the probability of occurrence defined based on the positional relationship between the first area and the persons to estimate the probability of occurrence of an event in the first area.

As described above, generally, shoplifting does not occur in full view of everyone. Thus, the probability of occurrence of shoplifting varies depending on whether or not a person (a first person) is present at a position having the distance to a first area to be equal to or smaller than a threshold value and whether or not the first area is present at a position that is a blind spot for another person (a second person). Herein, the blind spot is formed due to an obstruction, for example. Examples of the obstruction include a display shelf of products.

The threshold value mentioned above can be appropriately set. The same is the case regarding the threshold values used in various operations explained hereinafter.

The position of the obstruction can be set in advance in the common coordinate system. In conjunction with setting the position of the obstruction, the type and the height of the obstruction can also be set.

Example of Positional Relationship

Figure 2:
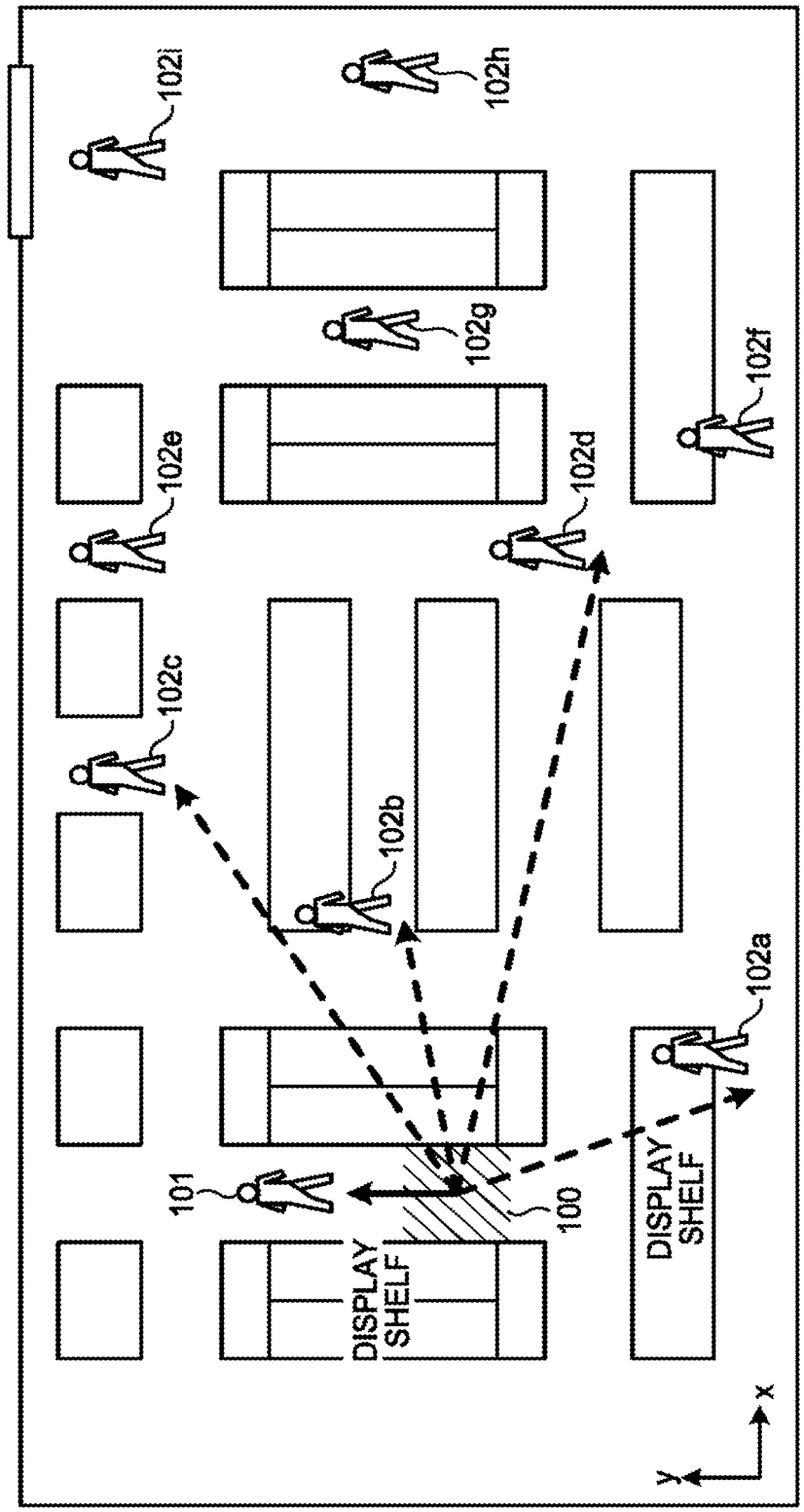
FIG. 2 is a diagram illustrating an example of the positional relationship between a first area and persons according to the first embodiment.

FIG. 2 is a diagram illustrating an example of the positional relationship between a first area and persons according to the first embodiment. In FIG. 2 is illustrated the position of a first area 100, the position of a first person 101, and the positions of second persons 102a to 102i in the common coordinate system. In the example illustrated in FIG. 2, area information indicating a first area as received by the receiving unit 1 represents coordinate information of the common coordinate system.

The distance between the first person 101 and the first area 100 is equal to or smaller than a threshold value (a threshold distance).

The first area 100 becomes a blind spot for the second persons 102a to 102d because of a display shelf. The second persons 102e to 102i who are present at positions having the distance to the first area 100 to be equal to or greater than the threshold value are believed to not impact the probability of event occurrence at the present timing. Hence, those persons 102e to 102i can be excluded from consideration.

In the example illustrated in FIG. 2, as the simplest example, it is illustrated that the estimating unit 4a estimates the probability of occurrence of shoplifting based on the presence or absence of obstructions between the first area 100 and the second persons 102. Focusing on the first area 100, although five persons are present around the first area 100, four of those persons (the second persons 102a to 102d) find the first area 100 to be a blind spot due to display shelves of products.

Thus, the situation is such that only the first person 101, who is being observed by nobody, has moved close to the first area 100, and it can be estimated that the probability of occurrence of shoplifting becomes higher in the first area 100. More particularly, the estimating unit 4a uses definition information which is defined based on the positional relationship between the first area 100 and the persons and in which, when only a person who is being observed by nobody (in the example of FIG. 2, the first person 101) has moved close to the first area 100, the probability of occurrence of shoplifting is defined to a value equal to or greater than a threshold value. And the estimating unit 4a estimates the probability of occurrence of an event in the first area 100 using the definition information.

Meanwhile, instead of completely excluding from consideration the second persons 102e to 102i who are present at positions having the distance to the first area 100 to be equal to or greater than the threshold value, weights can be set according to the distances from the first area 100 and can be used in calculating the probability of event occurrence. For example, the weights are set in such a way that, farther the distance from the first area 100, the smaller is the contribution to the calculation of the probability of event occurrence based on the presence or absence of obstructions.

Meanwhile, in the example illustrated in FIG. 2, for the sake of illustration, only a single first area 100 is illustrated. However, the probability of event occurrence can be estimated for each of a plurality of first areas.

Given below is the explanation of an information processing method according to the first embodiment.

Example of Information Processing Method

FIG. 3 is a flowchart for explaining an exemplary information processing method according to the first embodiment. Firstly, the receiving unit 1 receives one or more videos along with one or more pieces of area information indicating first areas (Step S1). Then, the detecting unit 2a detects persons from one or more videos received at Step S1 (Step S2).

Subsequently, the identifying unit 3a converts coordinate information of the camera coordinate system, which represents the positions of persons, into coordinate information of the common coordinate system (Step S3). Then, the identifying unit 3a uses the coordinate information of the common coordinate system as obtained at Step S3 and identifies the positional relationship between the first areas and the persons (Step S4).

Subsequently, the estimating unit 4a estimates the probability of event occurrence in the first areas from the positional relationship between the first areas and the persons as identified at Step S4 (Step S5).

As explained above, in the information processing device 10a according to the first embodiment, the receiving unit 1 receives videos and receives area information indicating first areas. Then, the detecting unit 2a detects persons from the videos. Subsequently, the estimating unit 4a estimates the probability of event occurrence in the first areas based on the positional relationship between the first areas and the persons.

With that, in the information processing device 10a according to the first embodiment, even if there is no history of event occurrence, the probability of event occurrence can be estimated for each particular area.

Meanwhile, the target event is not limited to shoplifting. That is, in the information processing device 10a according to the first embodiment, it is possible to estimate the probability of occurrence of an arbitrary event decided according to the relationship between the target area for estimating the probability of event occurrence and the persons present around that area.

For example, an event of staff calling, in which a station staff member at a station or a store staff member at a store is to be called for asking some favor, can be treated as the target event. Regarding an event of staff calling too, depending on whether or not a store staff member is present around the area in which the probability of event occurrence is to be estimated, the probability of event occurrence varies.

If the probability of occurrence of an event of staff calling can be estimated, then a staff member can be placed in advance according to the probability of occurrence of that event. With that, improvement in the customer satisfaction and optimization of staff allocation can be expected.

Modification Example of First Embodiment

Given below is the explanation of a modification example of the first embodiment. In the modification example of the first embodiment, the explanation identical to the first embodiment is not repeated, and only the differences with the first embodiment are explained.

In the modification example of the first embodiment, a notifying unit is included that, when the probability of occurrence of an event in a first area is equal to or greater than a threshold value, notifies that the probability of occurrence of an event in a first area is equal to or greater than a threshold value.

In the modification example of the first embodiment, the explanation is given for an example in which an event implies shoplifting.

Herein, the notification destination is, for example, a predetermined device, which can be an arbitrary device. When an event implies shoplifting, the predetermined device is, for example, a smart device carried by a store staff member.

Moreover, the notification method can be an arbitrary method. For example, as the notification method, a message can be displayed on a display unit of the predetermined device. Alternatively, as the notification method, a communication function such as an electronic mail can be used for notification purposes.

Furthermore, the notification destination can be an arbitrary destination. For example, the notification device can be a smart device carried by the store staff member who is closest to the concerned first area. Alternatively, for example, the notification destination can be a plurality of smart devices carried by all store staff members.

Concerning shoplifting, rather than the store staff members tackling the situation after shoplifting has occurred, it is desirable that shoplifting does not occur in the first place. For that reason, when the probability of occurrence of shoplifting is equal to or greater than a threshold value, the notifying unit can notify a predetermined device that the probability of occurrence of shoplifting is equal to or greater than a threshold value, and thus it can be expected that shoplifting is prevented from occurring. That also enables achieving enhancement in the customer satisfaction and achieving improvement in the operational efficiency of the store.

Second Embodiment

Given below is the explanation of a second embodiment. In the second embodiment, the explanation identical to the first embodiment is not repeated, and only the differences with the first embodiment are explained.

For example, in the case in which an event implies shoplifting, in the situation when a first area is a blind spot for other persons, if only one person is present in the vicinity of that first area, it is of course not always necessary that the concerned person is a potential shoplifter who is intending to shoplift. Rather, there is a high possibility that such a situation has occurred by coincidence. Hence, in the situation when the first area is a blind spot for other persons, if only one person is present in the vicinity of the first area, in case every time it is estimated that the probability of occurrence of shoplifting in that first area is equal to or greater than a threshold value, then there is a risk of a decline in the degree of confidence in the store.

In that regard, in the second embodiment, the explanation is given for a case in which an estimating unit 4b further uses information other than the positional relationship between the first areas and the persons, and estimates the probability of occurrence of an event.

Example of Functional Configuration

FIG. 4 is a diagram illustrating an exemplary functional configuration of an information processing device 10b according to the second embodiment. The information processing device 10b according to the second embodiment includes the receiving unit 1, a detecting unit 2b, an identifying unit 3b, the estimating unit 4b, and a memory unit 5.

The receiving unit 1 receives one or more videos and receives one or more pieces of area information indicating first areas.

From the videos received by the receiving unit 1, the detecting unit 2b detects persons as well as detects attribute information indicating the attributes of the persons. For example, the attribute information contains at least one of the following: age, gender, wearables, hairstyle, and race. Examples of the wearables include clothes and a cap.

The identifying unit 3b not only identifies the positional relationship between a first area and a person, but also identifies the movement trajectory of that person and behavior information indicating the behavior of that person.

Firstly, the explanation is given about a method for identifying the movement trajectory of a person.

Method for Identifying Movement Trajectory of Person

In the second embodiment, the identifying unit 3b identifies the movement trajectory of a person who is present in a store, for example.

The method for identifying the movement trajectory can be an arbitrary method. For example, with respect to a video taken by the same camera, a tracking technology can be implemented in which the same person is continually tracked across the frames included in the video. The identifying unit 3b implements, for example, a person tracking technology disclosed in Non-patent Literature, "The person track technology that can be chased even if it hides temporarily from the view of the camera TOSHIBA review", Vol. 70, No. 6, 2015, and identifies the movement trajectory of the person.

The identifying unit 3b converts coordinate information of the camera coordinate system, which indicates the positions of the detected persons and the movement of trajectory of the tracked person, into coordinate information of the common coordinate system. Then, the identifying unit 3b stores the coordinate information of the common coordinate system in the memory unit 5. Moreover, the identifying unit 3b stores, in the memory unit 5, the attribute information of the persons detected by the detecting unit 2b in a corresponding manner to partial images in which the persons are clipped from the videos.

When a person moves out of the viewing area of a video, the identifying unit 3b maps that person across the cameras and integrates the movement trajectory of the same person with the consistent movement trajectory of the person in the store. Since the mapping is performed for a person who is present in the store on that day, basically there is no change in the clothes. Hence, by performing pattern matching of the person images, the movement trajectories of similar persons can be integrated.

Moreover, in overlapping areas within the viewing area of the cameras, the trajectories of the persons who happen to be overlapping upon conversion to the common coordinate system can be integrated so as to map the persons. If a sufficient number of cameras are installed in the store, then the identifying unit 3b can map the persons across the cameras and identify the movement trajectories of the persons who are present in the store till the present timing since entering the store.

Meanwhile, the identifying unit 3b can identify the movement trajectory of a person from something other than the videos taken by the cameras. For example, the identifying unit 3b can uses the information obtained by a sensor that uses radio waves, and identify the movement trajectory of a person. For example, when a person is carrying a cellular phone, the identifying unit 3b can make use of the radio waves emitted from the cellular phone and identify the position of the person. Alternatively, for example, when a radio frequency identification (RFID) tag is embedded in advance in a shopping cart in the store, the identifying unit 3b can read the RFID tag and identify the position of the person.

Given below is the explanation of a method for identifying the behavior of a person.

Method for Identifying Behavior of Person

The method for identifying the behavior information indicating the behavior of a person can be an arbitrary method. For example, the identifying unit 3b identifies behavior information from the videos taken by the cameras. The behavior information contains, for example, at least one of the following: face orientation, direction of eyes, movement speed, hand movements, and period of stay.

The face orientation, the direction of eyes, and the movement speed of a person indicate, for example, whether or not the person performs any suspicious movements.

Examples of the hand movements include picking up a product, touching wearables such as a bag, and touching belongings such as a cellular phone.

The period of stay indicates the period of time for which the person stays in a second area including the first area. The second area indicates, for example, the entire selling space of the store. If the movement trajectory of the person since entering the store can be obtained, then the period of stay of that person can also be identified.

The estimating unit 4b estimates the probability of occurrence of an event in a first area not only based on the positional relationship between the first area and a person but also based on at least one of the movement trajectory of the person, the attribute information of the person, and the behavior information of the person.

Each of the movement trajectory, the attribute information, and the behavior information of the concerned person may have low relation to shoplifting directly. However, if the movement trajectory, the attribute information, and the behavior information of the concerned person are combined with each other, information distinctive to the potential shoplifter who is intending to shoplift is increasingly likely to be extracted.

There are numerous combinations of the information distinctive to the potential shoplifter who is intending to shoplift. However, for example, the identifying unit 3b can extract the information distinctive to the potential shoplifter, who is intending to shoplift, from a shoplifting occurrence model obtained using the method of machine learning. For example, the estimating unit 4b can estimate the probability of occurrence of shoplifting further based on the degree of similarity between the information distinctive to the potential shoplifter and the combination of the movement trajectory, the attribute information, and the behavior information of the person 101 illustrated in FIG. 2. For example, the estimating unit 4b increases the probability of occurrence of shoplifting, which is defined in the definition information explained earlier, by a value corresponding to the degree of similarity between the information distinctive to the potential shoplifter and the combination of the movement trajectory, the attribute information, and the behavior information of the person 101.

Case of Using Machine Learning

More particularly, consider a case in which there occurs shoplifting in a store and either the criminal who is caught makes a confession or the moment of shoplifting is identified from the cameras installed in the store so that when, where, and by whom did the shoplifting occur becomes clear. Moreover, it is assumed that the movement information, the attribute information, and the behavior information of the criminal at the time of shoplifting is obtained.

The estimating unit 4b sets the location of occurrence of shoplifting as the first area, and sets t as the timing of occurrence of shoplifting. Then, the estimating unit 4b can solve the optimization problem of the combination of the movement information, the attribute information, and the behavior information of the persons in such a way that there is 100% probability of occurrence of shoplifting in the first area at the timing t. More particularly, the estimating unit 4b uses the combination of the movement information, the attribute information, and the behavior information of the persons as inputs to a learning function; and solves the optimization problem of the combination of these information distinctive to the potential shoplifter.

As a matter of course, it is a difficult task to accurately learn a shoplifting occurrence model only from training data obtained after one instance of shoplifting. If a plurality of instances of shoplifting in the store can be identified, then the training data for learning increases in volume that much more. That leads to enhancement in the estimation accuracy of the information distinctive to the potential shoplifter as obtained from the shoplifting occurrence model.

However, if there is only a single target store for learning, there is a possibility that a sufficient number of instances of shoplifting required for learning cannot be collected. Besides, there is concern about the long time taken till training data becomes complete.

In that regard, the identifying unit 3b can convert the common coordinate system into a relative-common coordinate system including the first area.

The relative-common coordinate system is a coordinate system in which, for example, coordinates are used with the center of the first area, which is indicated in the common coordinate system, serving as the origin; and the positional relationship between the first area and a person is locally indicated. As a result of using the relative-common coordinate system, training data obtained in locally-similar areas across a plurality of stores can be used among those stores.

More particularly, the relative-common coordinate system can be normalized using certain rules so that comparison of training data becomes possible not only in the same store but also with other stores. Examples of the certain rules include conforming the unit of the relative-common coordinate system to, for example, meter; and setting the entrance of the store to a particular direction so as to match the orientation with the relative-common coordinate system.

Meanwhile, the origin of the relative-common coordinate system is not limited to the center of the first area, and can be set to an arbitrary point.

As a result of making the training data available for use across stores, a model obtained by learning the optimization at a particular store can be applied as a general model in other stores too. That also offers an advantage in being able to reduce the cost at the time of implementing the information processing device 10b.

Moreover, in a store in which the information processing device 10b is implemented, a general model can be used as the initial value, and the general model can be further learnt in an adaptive manner. As a result, the general model can be applied in the stores in which the information processing device 10b is implemented, thereby enabling achieving enhancement in the estimation accuracy of the probability of occurrence of an event.

Given below is the explanation of an information processing method according to the second embodiment.

Example of Information Processing Method

FIG. 5 is a flowchart for explaining an exemplary information processing method according to the second embodiment. Firstly, the receiving unit 1 receives one or more videos and receives one or more pieces of area information indicating first areas (Step S11).

Then, the detecting unit 2b detects persons from one or more videos received at Step S11 (Step S12). Subsequently, the detecting unit 2b detects attribute information from one or more videos received at Step SS11 (Step S13).

Then, the identifying unit 3b converts the coordinate information of the camera coordinate system, which indicates the positions of the persons, into coordinate information of the common coordinate system (Step S14). Subsequently, the identifying unit 3b uses the coordinate information of the common coordinate system obtained at Step 314, and identifies the positional relationship between the first areas and the persons (Step S15). Then, the identifying unit 3b identifies the movement trajectory and the behavior information of the persons from one or more videos received at Step S11 (Step S16).

Subsequently, from the positional relationship between the first areas and the persons as identified at Step S15 as well as from the movement trajectory and the behavior information of the persons as identified at Step S16, the estimating unit 4b estimates the probability of occurrence of an event in the first areas (Step S17).

As described above, in the information processing device 10b according to the second embodiment, by using the movement trajectory, the attribute information, and the behavior information; the estimating unit 4b can handle a greater volume of information of the persons around the first areas. That enables achieving enhancement in the estimation accuracy of the probability of event occurrence.

First Modification Example of Second Embodiment

Given below is the explanation of a first modification example of the second embodiment. In the first modification example of the second embodiment, the explanation identical to the second embodiment is not repeated, and only the differences with the second embodiment are explained.

In the first modification example of the second embodiment, the example is given for a case in which the estimating unit 4b further uses information other than the movement trajectory, the attribute information, and the behavior information; so that the estimation accuracy of the probability of occurrence of an event can be further enhanced.

In the first modification example of the second embodiment, the explanation is given for an example in which an event implies shoplifting.

For example, the estimating unit 4b can further use, for example, the attribute information indicating the attributes of the first areas. The attribute information is set according to, for example, the types of display shelves such as condiments, fresh products, and confectionary. Alternatively, for example, the attribute information is set according to the positions of the first areas in the store.

Dependent on the position of a first area in the store, the probability of occurrence of shoplifting may vary. For example, when a first area is at an obscure position, the probability of occurrence of shoplifting in that first area is likely to be higher than in the other areas. Thus, by further using the attribute information, the estimating unit 4b can further enhance the estimation accuracy of the probability of occurrence of shoplifting.

Moreover, for example, the estimating unit 4b can further use the information such as the time, the day of the week, and the weather. For example, the estimating unit 4b can estimate the probability of occurrence in a first area further according to the timing. More particularly, for example, the estimating unit 4b further uses the attribute information and the time information of the first area. As a result, the estimating unit 4b can estimate the probability of occurrence of shoplifting by further taking into account the information such as shoplifting of fresh products occurs frequently in the evening time.

According to the first modification example of the second embodiment, it becomes possible to further enhance the estimation accuracy of the probability of occurrence of an event.

Second Modification Example of Second Embodiment

Given below is the explanation of a second modification example of the second embodiment. In the second modification example of the second embodiment, the explanation identical to the second embodiment is not repeated, and only the differences with the second embodiment are explained.

In the second modification example of the second embodiment, the explanation is given for a case in which, when the attribute information of a person meets a predetermined condition, the estimating unit 4b varies the probability of event occurrence, thereby leading to further enhancement in the estimation accuracy of the probability of event occurrence.

In the second modification example of the second embodiment, the explanation is given for an example in which an event implies shoplifting.

When an event implies shoplifting, if a person is present near a potential shoplifter, then it is believed that the possibility of shoplifting is lower in the case in which the nearby person is a security guard than in the case in which the nearby person is just another shopper.

When the detected person is a store staff member such as a store employee or a security guard, the detecting unit 2b assigns identification information such as a special label.

Generally, the store staff members such as store employees can be made to look distinguishable from the shoppers by making use of wearables such as a particular uniform. Even if there is no uniform and the shoppers are outwardly indistinguishable from the store staff members, it is believed that the probability of occurrence of shoplifting is not impacted in the first place.

When the shoppers and the store staff members are outwardly distinguishable, the detecting unit 2b implements the pattern recognition technology and detects whether or not a person is a store staff member. Herein, the detecting unit 2b can implement an arbitrary method for detecting the store staff members. If a store staff member is carrying a sensor such as a RFID tag, then the detecting unit 2b can use the radio waves emitted from the RFID tag and detect whether or not a person is a store staff member.

The identifying unit 3b identifies the distance between a first area and a store staff member.

According to the distance between the first area and the store staff member, the estimating unit 4b varies the probability of occurrence of shoplifting. For example, if the distance between the first area and the store staff is equal to or smaller than a threshold value, then the estimating unit 4b lowers the probability of occurrence of shoplifting.

Meanwhile, in the case of learning a shoplifting occurrence model using machine learning; for example, the estimating unit 4b inputs training data, in which a variable representing a shopper and a variable representing a store staff member are distinguished, to a learning function and learns the shoplifting occurrence model. Alternatively, for example, the estimating unit 4b distinguishes a learning function in which training data containing a variable indicating a shopper is input from a learning function in which training data containing a variable indicating a store staff member is input, and learns the shoplifting occurrence model.

According to the second modification example of the second embodiment, it becomes possible to further enhance the estimation accuracy of the probability of occurrence of an event.

Third Modification Example of Second Embodiment

Given below is the explanation of a third modification example according to the second embodiment. In the third modification example of the second embodiment, the explanation identical to the second embodiment is not repeated, and only the differences with the second embodiment are explained.

In the third modification example of the second embodiment, the explanation is given for a case in which the estimating unit 4b estimates the predicted time till the occurrence of an event.

In the third modification example of the second embodiment, the explanation is given for an example in which an event implies shoplifting.

When the timing t of occurrence of shoplifting is provided, the estimating unit 4b can output, as training data with respect to a situation at a timing t-a (a situation in which input data such as the movement trajectory, the attribute information, and the behavior information of a person is obtained), a training signal indicating that shoplifting would occur after the timing a. The estimating unit 4b performs machine learning by setting the training signal for the optimization problem. As a result, in any arbitrary situation, it becomes possible to predict the timing at which the next instance of shoplifting would occur.

According to the third modification example of the second embodiment, it becomes possible to predict the timing at which the next instance of shoplifting would occur.

Fourth Modification Example of Second Embodiment

Given below is the explanation of a fourth modification example according to the second embodiment. In the fourth modification example of the second embodiment, the explanation identical to the second embodiment is not repeated, and only the differences with the second embodiment are explained.

In the fourth modification example of the second embodiment, the explanation is given for a case in which a first area includes, partially or entirely, the area representing a blind spot for the cameras taking the videos.

In the fourth modification example of the second embodiment, the explanation is given for an example in which an event implies shoplifting.

Figure 6:
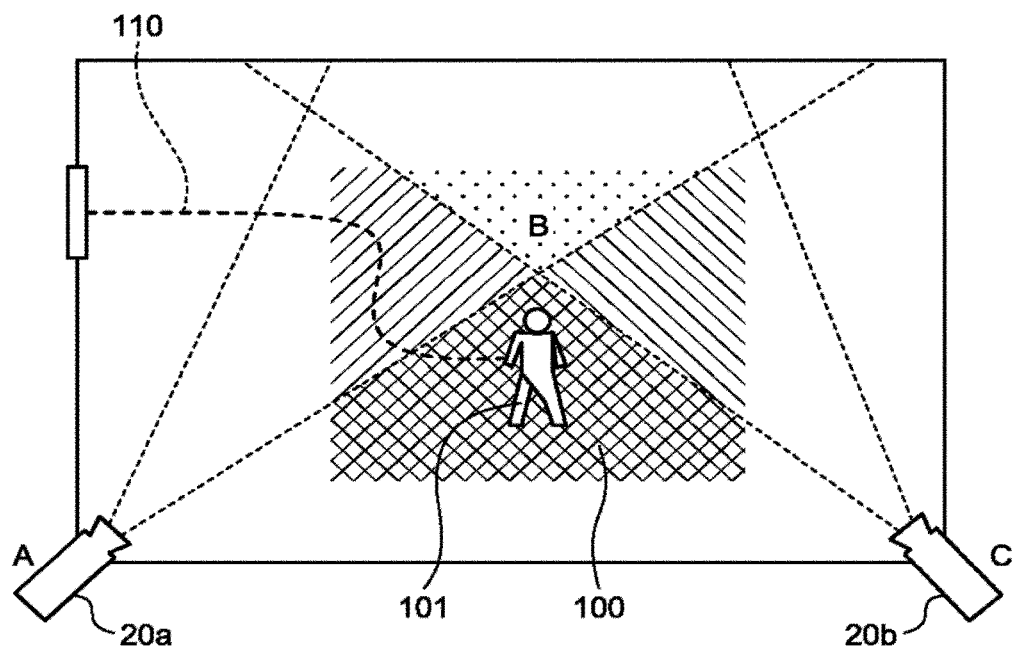
FIG. 6 is a diagram for explaining the operations performed in the information processing device according to a fourth modification example of the second embodiment.

FIG. 6 is a diagram for explaining the operations performed by the estimating unit 4b according to the fourth modification example of the second embodiment. In FIG. 6 is illustrated an example in which the area of a triangle ABC becomes a blind spot for cameras 20a and 20b. The first area 100 includes some part of the area of the triangle ABC. In the following explanation, when the cameras 20a and 20b need not be distinguished from each other, they are simply referred to as the cameras 20.

Usually, since the cameras 20 are fixedly installed, the viewing area of the cameras 20 can be known in advance. Thus, in the common coordinate system, it is possible to indicate which coordinates are within the viewing area and which coordinates are outside of the viewing area.

At the time when the identifying unit 3b tracks a person using the videos taken by the cameras 20, there are times when the person moves out of the angles of view of the cameras 20 that have taken the videos.

In FIG. 6 is illustrated an example in which, while tracking the person 101 (102) partway of a movement trajectory 110 using the video taken by the camera 20a, the person 101 moves out of the angle of view of the camera 20a. Moreover, the person 101 is not captured in the video taken by the camera 20b. Thus, the area in which the person 101 is likely to be present is the area of the triangle ABC.

Moreover, there is a possibility that the person 101 is present in the overlapping area of the area of the triangle ABC and the first area 100. Thus, by taking into account the case in which the person 101 is not captured in the videos taken by the cameras 20 but is still present at a blind spot for the cameras 20, the estimating unit 4b estimates the probability of occurrence of shoplifting in the first area 100.

The method for taking into account the case in which the person 101 is not captured in the videos taken by the cameras 20 but is still present at a blind spot for the cameras 20 can be an arbitrary method. In a simplistic form, for example, at the time of learning the probability of occurrence of shoplifting by solving the optimization problem, the estimating unit 4b refers to state information indicating the presence or absence of the person 101 at a blind spot. The state information is, for example, a parameter such as a flag. Alternatively, for example, when the period of time for which the person 101 is present at a blind spot for the cameras 20 is equal to or greater than a threshold value, the estimating unit 4b sets the probability of occurrence of shoplifting in the first area 100 to be equal to or greater than a threshold value.

By taking into account the blind spots for the cameras 20 as described above, even if the person 101 (102) is present outside the angles of view of the cameras 20 taking the videos, the estimating unit 4b can enhance the estimation accuracy of the probability of occurrence of shoplifting in the first area 100.

According to the fourth modification example of the second embodiment, even if a first area includes, partially or entirely, the area representing a blind spot for the cameras taking the videos, it becomes possible to enhance the estimation accuracy of the probability of occurrence of an event in the first area.

Fifth Modification Example of Second Embodiment

Given below is the explanation of a fifth modification example according to the second embodiment. In the fifth modification example of the second embodiment, the explanation identical to the second embodiment is not repeated, and only the differences with the second embodiment are explained.

In the fifth modification example of the second embodiment, the explanation is given for a case in which the detecting unit 2b further detects predetermined objects such as alarm devices and cameras, and the estimating unit 4b varies the probability of event occurrence further based on the distances from the predetermined objects to a first area, thereby leading to further enhancement in the estimation accuracy of the probability of event occurrence.

In the fifth modification example, the explanation is given for an example in which an event implies shoplifting.

In the case in which an event implies shoplifting, when predetermined objects such as an alarm device and a camera are present near a first area or near a potential shoplifter, it is possible to think that the possibility of shoplifting is lower than in the case in which the predetermined objects are not present near a potential shoplifter.

The detecting unit 2b assigns identification information such as a special label to a detected predetermined object.

The identifying unit 3b identifies the distance from a first area to a predetermined object.

The estimating unit 4b varies the probability of occurrence of shoplifting based on the distance from a first area to a predetermined object. For example, when the distance from a first area to a predetermined object is equal to or smaller than a threshold value, the estimating unit 4b lowers the probability of occurrence of shoplifting.

Moreover, in the case of learning a shoplifting occurrence model using machine learning; for example, the estimating unit 4b inputs, in a learning function, training data containing a variable indicating the presence or absence of a predetermined object, and learns the shoplifting occurrence model.

According to the fifth modification example of the second embodiment, it becomes possible to further enhance the estimation accuracy of the probability of occurrence of an event.

Lastly, the explanation is given about an exemplary hardware configuration of the information processing devices 10 according to the first and second embodiments.

Example of Hardware Configuration

Figure 7:
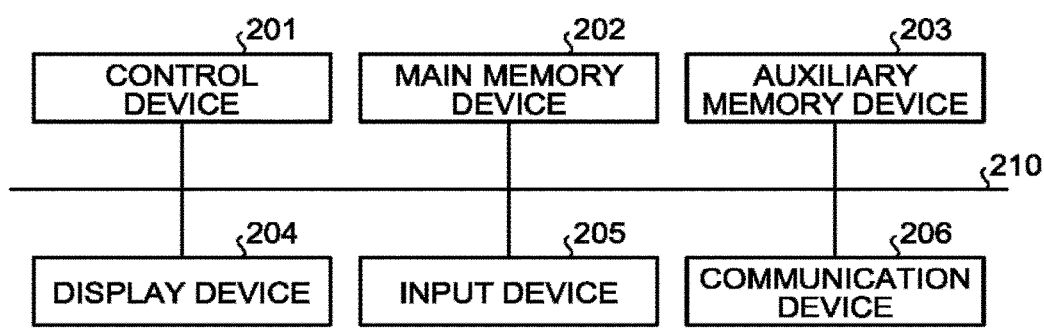
FIG. 7 is a diagram illustrating an exemplary hardware configuration of the information processing devices according to the first and second embodiments.

FIG. 7 is a diagram illustrating an exemplary hardware configuration of the information processing devices 10 according to the first and second embodiments. The information processing devices 10 according to the first and second embodiments includes a control device 201, a main memory device 202, an auxiliary memory device 203, a display device 204, an input device 205, and a communication device 206. Herein, the control device 201, the main memory device 202, the auxiliary memory device 203, the display device 204, the input device 205, and the communication device 206 are connected to each other by a bus 210.

The control device 201 executes computer programs that are read from the auxiliary memory device 203 into the main memory device 202. The control device 201 represents one or more processors such as central processing units (CPUs). The main memory device 202 represents a memory such as a read only memory (ROM) or a random access memory (RAM). The auxiliary memory device 203 represents a device such as a memory card or a hard disk drive (HDD).

The display device 204 displays information. Examples of the display device 204 include a liquid crystal display. The input device 205 receives input of information. Examples of the input device 205 include a keyboard and a mouse. Meanwhile, the display device 204 and the input device 205 can be configured together as a liquid crystal touch panel having the display function and the input function. The communication device 206 performs communication with other devices.

The computer programs that are executed in the information processing devices 10 according to the first and second embodiments are stored as installable or executable files in a computer-readable memory medium such as a compact disk read only memory (CD-ROM), a memory card, a compact disk recordable (CD-R), or a digital versatile disc (DVD); and are provided as a computer program product.

Alternatively, the computer programs that are executed in the information processing devices 10 according to the first and second embodiments can be stored in a downloadable manner in a computer connected to a network such as the Internet. Still alternatively, the computer programs that are executed in the information processing devices 10 according to the first and second embodiments can be distributed via a network such as the Internet without involving downloading.

Still alternatively, the computer programs that are executed in the information processing devices 10 according to the first and second embodiments can be stored in advance in a ROM.

The computer programs that are executed in the information processing devices 10 according to the first and second embodiments contain modules of such functions in the functional configuration of the information processing devices 10 according to the first and second embodiments which can be implemented using computer programs.

Regarding the functions that are implemented using computer programs, the control device 201 reads computer programs from a memory medium such as the auxiliary memory device 203 and loads them in the main memory device 202. That is, the functions implemented using computer programs are generated in the main memory device 202.

Meanwhile, some of the functions of the information processing devices 10 according to the first and second embodiments can be implemented using hardware such as an integrated circuit (IC), which is a processor for performing dedicated operations.

In the case of implementing the functions using a plurality of processors, each processor can be used either to implement a single function or to implement two or more functions.

Meanwhile, the information processing devices 10 according to the first and second embodiments can have any arbitrary mode of operations. For example, the information processing devices 10 according to the first and second embodiments can be operated as a device constituting a cloud system in a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a memory; and
processing circuitry configured to:
receive an image and area information indicating a first area;
detect an object from the image; and
based on positional relationship between the first area and the object and based on a movement trajectory of the object, estimate probability of occurrence of an event in the first area,
wherein the object is a person, and
when a first person is present at a position whose distance to the first area is equal to or smaller than a first threshold value and when an obstruction is present between the first area and one or more second persons, the estimating sets the probability of occurrence of an event in the first area to be equal to or greater than a second threshold value.

2. The device according to claim 1, wherein
when the object moves out of viewing area of the image and when the object is likely to be present in the first area, the circuitry is further configured to set state information indicating that the object is likely to be present in the first area, and
the estimating estimates the probability of occurrence of an event in the first area further based on the state information.

3. The device according to claim 1, wherein
the object is a person,
the detecting further detects attribute information indicating attribute of the person, and
the estimating estimates the probability of occurrence of an event in the first area further based on the attribute information.

4. The device according to claim 3, wherein the attribute information contains at least one of age, gender, wearables, belongings, hairstyle, and race.

5. The device according to claim 1, wherein
the object is a person, and
the estimating estimates the probability of occurrence of an event in the first area further based on behavior information indicating behavior of the person.

6. The device according to claim 5, wherein the behavior information contains at least one of face orientation of the person, direction of an eye of the person, a movement speed of the person, a hand movement of the person, and a period of stay for which the person stays in a second area including the first area.

7. The device according to claim 1, wherein
the detecting further detects a predetermined object from an image, and
the estimating estimates the probability of occurrence of an event in the first area further based on distance between the predetermined object and the first area.

8. The device according to claim 1, wherein the estimating estimates the probability of occurrence of an event in the first area further based on attribute information indicating attribute of the first area.

9. The device according to claim 1, wherein the estimating estimates the probability of occurrence of an event in the first area further according to the time of day.

10. The device according to claim 1, wherein the estimating further estimates a timing at which the probability of occurrence of an event in the first area becomes equal to or greater than a threshold value.

11. The device according to claim 1, wherein the circuitry is further configured to, when the probability of occurrence of an event in the first area is equal to or greater than a threshold value, notify that the probability of occurrence of the event in the first area is equal to or greater than the threshold value.

12. An information processing method comprising:
receiving an image and area information indicating a first area;
detecting an object from the image; and
estimating, based on positional relationship between the first area and the object and based on a movement trajectory of the object, probability of occurrence of an event in the first area,
wherein the object is a person, and when a first person is present at a position whose distance to the first area is equal to or smaller than a first threshold value and when an obstruction is present between the first area and one or more second persons, the estimating sets the probability of occurrence of an event in the first area to be equal to or greater than a second threshold value.

13. The method according to claim 12, wherein when the object moves out of viewing area of the image and when the object is likely to be present in the first area, the detecting includes setting state information indicating that the object is likely to be present in the first area, and the estimating estimates the probability of occurrence of an event in the first area further based on the state information.

14. The method according to claim 12, wherein the object is a person, the detecting further detects attribute information indicating attribute of the person, and the estimating estimates the probability of occurrence of an event in the first area further based on the attribute information.

15. The method according to claim 14, wherein the attribute information contains at least one of age, gender, wearables, belongings, hairstyle, and race.

16. A computer program product comprising a non-transitory computer-readable medium including programmed instructions, wherein the instructions, when executed by a computer, cause the computer to function as:

a receiving unit configured to receive an image and area information indicating a first area;

a detecting unit configured to detect an object from the image; and an estimating unit configured to, based on positional relationship between the first area and the object and based on a movement trajectory of the object, estimate probability of occurrence of an event in the first area, wherein the object is a person, and when a first person is present at a position whose distance to the first area is equal to or smaller than a first threshold value and when an obstruction is present between the first area and one or more second persons, the estimating sets the probability of occurrence of an event in the first area to be equal to or greater than a second threshold value.

* * * * *